O. H. PADDOCK.
HEADLIGHT TURNING MEANS FOR VEHICLES.
APPLICATION FILED AUG. 24, 1914.
1,156,623.
Patented Oct. 12, 1915.
3 SHEETS—SHEET 1.
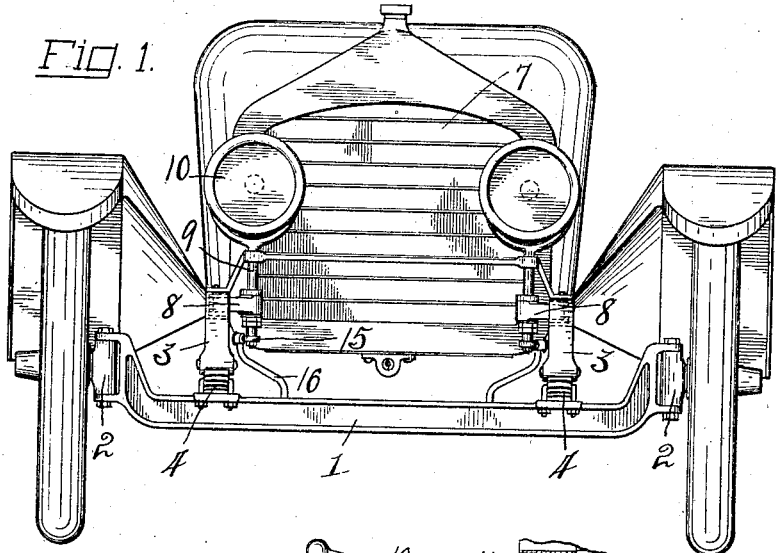
Fig. 1.
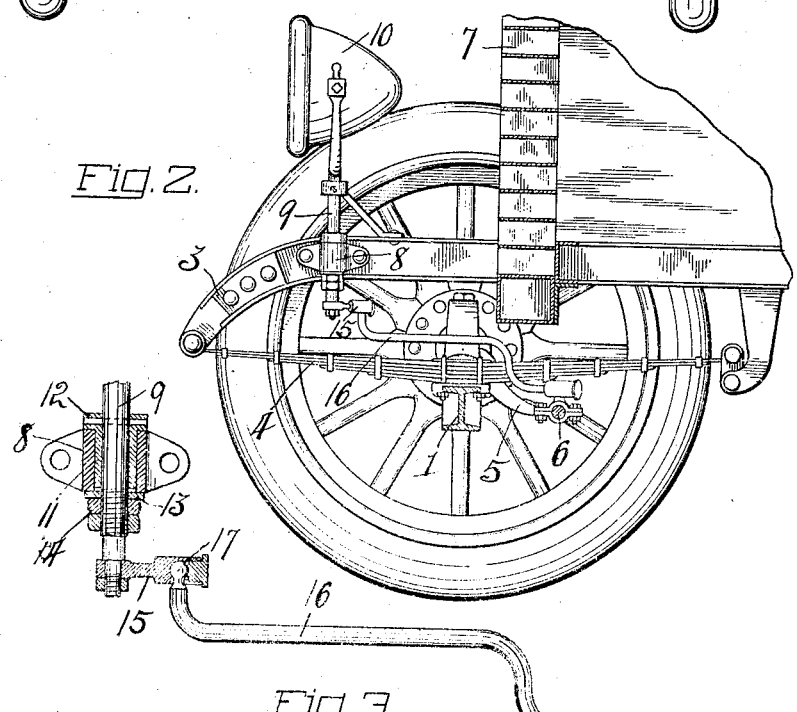
Fig. 2.
Fig. 3.
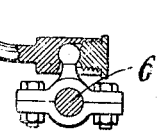
WITNESSES.
R. J. Allen
F. E. Aul
INVENTOR.
Ormond H. Paddock,
By Owen, Owen & Crampton,
His attys.

O. H. PADDOCK.
HEADLIGHT TURNING MEANS FOR VEHICLES.
APPLICATION FILED AUG. 24, 1914.
1,156,623.
Patented Oct. 12, 1915.
3 SHEETS—SHEET 2.
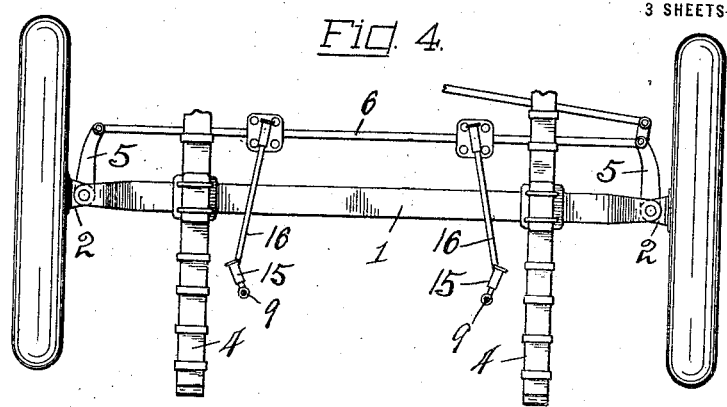
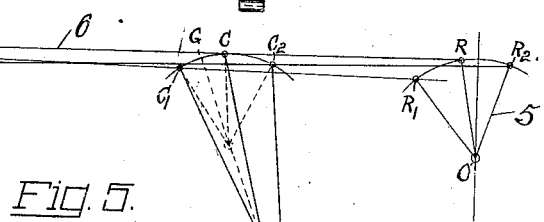
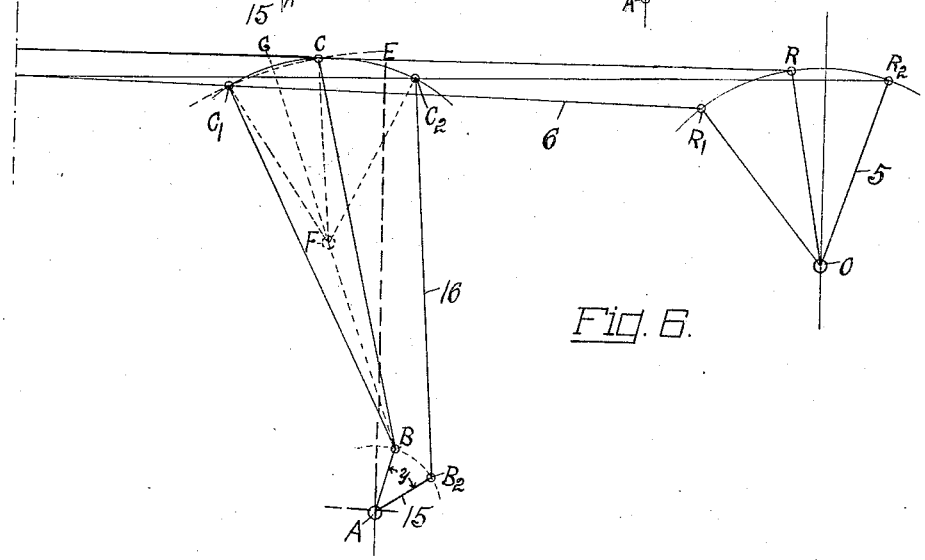
WITNESSES:-
INVENTOR.
Ormond H. Paddock,
By Owen, Owen & Crampton
His attys.

O. H. PADDOCK.
HEADLIGHT TURNING MEANS FOR VEHICLES.
APPLICATION FILED AUG. 24, 1914.
1,156,623.
Patented Oct. 12, 1915.
3 SHEETS—SHEET 3.
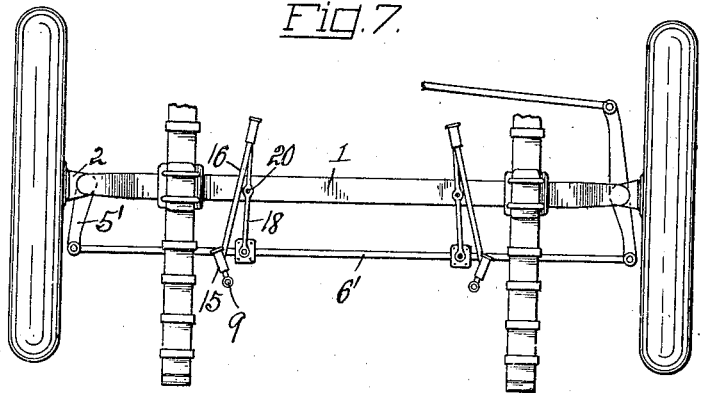
Fig. 7.
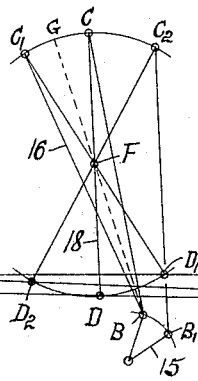
Fig. 8.
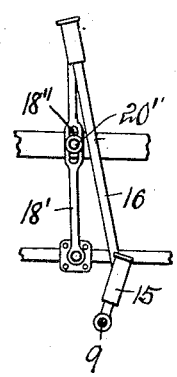
Fig. 10.
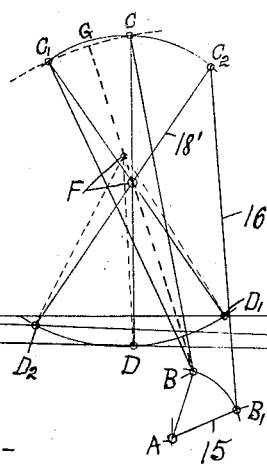
Fig. 9.
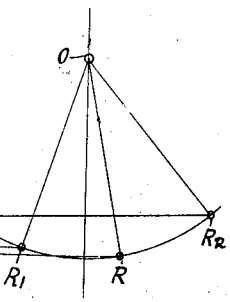
WITNESSES:—
R. G. Allen
F. E. Aul.
INVENTOR.
Ormond H. Paddock,
By Owen, Owen & Crampton,
his attys.

UNITED STATES PATENT OFFICE.

ORMOND H. PADDOCK, OF TOLEDO, OHIO.

HEADLIGHT-TURNING MEANS FOR VEHICLES.

1,156,623.  Specification of Letters Patent.  Patented Oct. 12, 1915.

Application filed August 24, 1914. Serial No. 858,285.

*To all whom it may concern:*

Be it known that I, ORMOND H. PADDOCK, a citizen of the United States, and a resident of Toledo, in the county of Lucas and State of Ohio, have invented a certain new and useful Headlight-Turning Means for Vehicles; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates particularly to head lamp moving means for automobiles, but is not restricted to such use as it may be used in any connection for which it may be adapted or appropriate.

The object of my invention is the provision of automatically operable means for horizontally turning one or the other of a pair of head lamps of a vehicle upon a turning of the vehicle in either of opposite direction, whereby upon making a turn in one direction one lamp is moved relative to the vehicle in the direction of turning and the other lamp remains in substantially stationary or straight-ahead position relative to the vehicle, and vice versa, thus enhancing the practicability of vehicle head lamps.

The invention is fully described in the following specification, and while, in its broader aspect, it is capable of embodiment in numerous forms, a preferred and two modified forms of the same are illustrated in the accompanying drawings, in which—

Figure 1 is a front elevation of a vehicle equipped with my invention with the steering-bar disposed at the rear of the front axle. Fig. 2 is a sectional side elevation thereof. Fig. 3 is an enlarged detail of a portion of the invention. Fig. 4 is a plan view of the front portion of a vehicle chassis with the side frame bars removed and parts of the invention in operative position. Fig. 5 is a diagram of the relative movements of the headlight moving parts with the steering-bar disposed at the rear of the axle, as shown in Fig. 4. Fig. 6 is an enlarged detail of one-half of the diagram shown in Fig. 5. Fig. 7 is a view similar to Fig. 4 with the steering-bar disposed in front of the axle and the mechanism embodying the invention modified to suit the changed position of such bar. Fig. 8 is a diagram of the relative movements of the head lamp and moving parts shown in Fig. 7. Fig. 9 is a similar diagram of the movement of the form of the invention which is slightly modified over that shown in Fig. 7, and Fig. 10 is a plan of such modification.

Referring to the drawings, 1 designates the front axle of an automobile, 2, 2 the front or steering-wheel carrying-knuckles, which are attached to the ends of the axle in the usual or any suitable manner for horizontal turning movements relative thereto.

3, 3 designate the side frame bars of an automobile chassis, and 4, 4 the springs, which are interposed between the axle 1 and the front end portions of the side bars.

In a majority of the automobiles manufactured the steering knuckles 2 are each provided with a rearwardly extending arm 5, which arms are connected at the rear of the axle by a steering rod 6, as shown in Figs. 1, 2 and 4. In some automobiles, however, the steering knuckles 2 are provided with forwardly extending arms, as shown in Fig. 7, which arms are designated 5′ and connected by a steering rod 6′ disposed in advance of the axle 1.

Attached to each side-bar 3 in advance of the automobile radiator 7, in the present instance, at the inner side of the side-bar, is a bearing arm or bracket 8 in which is mounted a vertically disposed rock-shaft or stem 9, the upper end of which is forked to adapt it to carry a head-lamp 10. The shaft or stem 9 is shown, in the present instance, (see Fig. 3) as being pinned or otherwise suitably fixed to a flanged bushing member 11, which has a bearing in the bracket arm 8 with its flange 12 resting on such arm. A washer 13 encircles the shaft 9 below the bracket 8 and is held in loose turning engagement with the lower end of the bracket by nuts 14, one of which serves as a jam-nut. It will be understood that this construction is merely illustrative of one manner of mounting the lamp carrying shafts 9 and may be changed as desired.

The shafts 9, 9 have arms 15, 15 fixed to their lower ends and rearwardly projected therefrom in divergent relation, with the free or outer end portion of each preferably, but not necessarily, in ball-and-socket joint connection with an associated link or bar 16, as shown at 17 in Fig. 3. The bars 16, 16 extend rearwardly in the present instance, in converging relation from the respective arms 15, 15 and, if the steering-bar 6 is disposed at the rear of the axle, each has universal connection therewith, as shown in Figs. 2, 3 and 4. If the steering mechanism is of the type in which the steering-bar is disposed in advance of the front axle the rear end of each bar 16 is connected to the steering bar 6' through the medium of a lever member 18, which extends forwardly from the rear end of the bar 16 across the axle 1 and has its forward end pivotally connected to the steering bar 6', as at 19, and its rear end universally connected to the rear end of the bar 16. The fulcrum of the lever 18 is located, in the present instance, at 20 and projects upward from the axle 1. If desired the pivot 20, instead of acting as a true fulcrum for the lever 18, may have sliding connection with the lever 18 longitudinally thereof, as indicated in Fig. 10, in which figure 18' designates the lever which is longitudinally slotted, as at 18'' for the pivot pin 20' to project through.

The idea of the invention is best understood by reference to the diagrammatical figures of the same, those shown in Figs. 5 and 6 being taken up first.

When the steering-arms 5 are in a central position, O R, the lamps are both held in a central or straight-ahead position. Each of the right and left hand attachments embodying this form of the invention are designated A B C. As the steering-arms are moved from a central position through a maximum angle, say, 30°, in turning the machine to the left, the left hand or inside lamp remains practically stationary, the left attachment then assuming the position A B C. It will be noted that the left hand lamp occupies a true straight-ahead position both when the steering-arms are in a central position and when turned in one direction a maximum distance. Midway between these two positions of the steering-arms, the lamp is turned to the left, about its axis, in the direction in which the machine is turning, through a very slight angle of not over 3 to 5°, due to the fact that an arc about point B which intersects point C and $C_1$ varies from the arc of movement of point C, as indicated by the full and dotted arcuate lines intersecting the points C $C_1$ in Fig. 6. The same movement of the steering-arms 5 produces an angular turning movement toward the left of the right-hand lamp proportional to the movement of the steering-arms, as shown by right hand attachment position A $B_2$ $C_2$. With the steering-arms turned to a maximum position of 30° the lamp is turned about its axis approximately 35°. In turning the machine in the opposite direction the action of the lamps is reversed.

In turning the machine in either direction the outside lamp turns in the direction in which the machine is turning, while the inside lamp is held in its straight-ahead position or practically so. With the two steering-arms 5 in the positions O $R_1$ and O $R_2$, respectively, one lamp attachment is always in position A B $C_1$ and the other in position A $B_2$ $C_2$.

It is found by experimenting that the ratio between the turning angle of the lamps and the steering-arms 5 is variable, and is controlled by various elements in the design. For instance, the length of the steering-arms is fixed by the design of the automobile, and the design of the headlight controlling attachment must vary so that for any fixed length of the arm, the desired angular movements of the lamp may be obtained.

The point C of connection of the rod 16 with the steering rod 6 may be varied without affecting the invention. As a steering-arm moves from one maximum position $R_1$ to the other maximum position $R_2$, C describes the arc of a circle $C_1$ C $C_2$, with center at F. The center F having been located, the angle C F C' is bisected through F. The position of the point B, which is the point of connection of the attachment members 15 and 16, is determined by the line of bisection G F produced through F, as said point must fall some place on such line. It is therefore evident that the point B is identical for the two positions of the steering rod R C and $R_1$ $C_1$, i. e., the lamp will have a true straight-ahead position when the point of connection between the steering rod 6 and the rod 16 is both at the neutral position C and the shifted position $C_1$, which shifted position may or may not be the maximum turning position of such point. As the steering arm O R moves from a central position to a maximum right turning position, O $R_2$ (Fig. 6), B C takes the position $B_2$ $C_2$, and the lamp is turned to the right through an angle $y$. The angle $y$ which is the maximum turning movement of the arm A B, or the lamp, varies directly as the length of the steering arm O, R, i. e., it increases as length O R increases.

The dotted line A E represents the distance between the vertical plane of the points A and C, and it will be seen that the angle $y$ varies in inverse proportion to this distance. As A E increases, the lateral position of A to C remaining constant, $y$ increases. It will also be seen that as length A B decreases the turning angle $y$ increases. It is found that the practical working range of angular movement of the lamp can be made to vary from 50% less to 50% greater than the angular movement of the steering-arms.

The design and adjustment of the attachment parts should be such that the angle between the members 15 and 16 is not greater than 145° when the lamp is in straight-ahead position, as this will insure positive action and will avoid possibility of dead center.

It will be noted by reference to Figs. 7 and 8, illustrating the form of the invention in which the steering rod is disposed in advance of the front axle, that for any movement of the steering-arms from a straight-ahead position, the movements of the arms of the attachment A B, B C and of the lamps is the same as previously described for vehicles having the steering-bar in rear of the front axle, due to the interposing of the lever 18 between the steering-rod 6′ and the rod 16 and fulcruming such lever at a point designated F in the diagram (Fig. 8). In the diagram, let C represent the point of connection between the members 18 and 16, D the point of connection between the members 6′ and 18, and F the fulcrum point of the lever 18, the other designations being the same as in the diagram (Figs. 5 and 6), and it will be noted that the arc $C_1$ C $C_2$ corresponds to the like arc in Figs. 5 and 6 and that the arc $D_1$ D $D_2$ is the same. The point B is found in the same manner as previously described, namely, by bisecting the angle C F C′ and placing such point on the line of bisection produced through F. It is also found that it is not necessary to provide the lever member 18 with a fixed center, as the pivot pin for such lever may be placed eccentrically and project through a slot in the lever, as shown at 18″ (Fig. 10) to permit a longitudinal movement of the lever relative to the axle. The diagram of movement of this form is illustrated in Fig. 9 and from it it will be noted that the point C, when moved, does not describe a true arc due to a changing of the pivot F relative to the ends of the lever member when such member is being swung, otherwise the action is the same as described in connection with Fig. 8.

It is therefore apparent that the general design of the attachment, the shaping of the steering-arms, the position of the lamps and attachment on the automobile, and the method of attaching the lamps and the turning attachments to the machine are all subject to considerable variation, and depend largely on various elements in the construction and the design of the automobile upon which the attachment is to be used, such as the relative positions, proportions and shapes of the steering-arms, connecting rods and axles, and the design of the front spring suspension and position of the lamps on the automobile. The appearance and the desired turning movements of the lamps should also be considered.

I wish it understood that my invention is not limited to any specific construction, arrangement or form of the parts except in so far as such limitations are specified in the claims.

Having thus described my invention, what I claim as new, and desire to secure by Letters Patent, is,—

1. In a vehicle, a steering wheel, a headlamp mounted for horizontal pivotal movements, means having connection with and movable upon a steering movement of said wheel, a double-link connection between said lamp and a swinging point on said means, the point of connection of said links when the steering wheel and lamp are in straight-ahead position substantially falling on a line which is equidistant from predetermined positions of said swinging point during a swinging movement thereof and produced through the swinging axis of such point.

2. In a vehicle, a steering wheel, a headlamp mounted for horizontal pivotal movements, mechanism having connection with and movable upon a steering movement of said wheel, an arm connected to and having coaxial swinging movements with said lamp, and means connecting said arm and a swinging point on said means, the point of connection of said means and arm when the steering wheel and lamp are in straight-ahead position substantially falling on a line which is equidistant from the neutral position of said swinging point and a predetermined position of the same to which it may be swung from said neutral position.

3. In a vehicle, a steering wheel, a headlamp mounted for horizontal pivotal movements, mechanism having connection with and movable upon a steering movement of said wheel, an arm connected to and having coaxial swinging movements with said lamp, and means connecting said arm and a swinging point on said mechanism, the connection between said means and arm being of a pivotal nature and, when the steering wheel and lamp are in straight-ahead position, substantially falling on a perpendicular line which bisects a chord of a predetermined curve described by said swinging point.

4. In a vehicle, a steering wheel, a headlamp mounted for horizontal pivotal movements, mechanism having connection with and movable upon a steering movement of said wheel, an arm connected to and having coaxial swinging movements with said lamp, and means connecting said arm and a swinging point on said mechanism, the connection between said means and arm being of a pivotal nature and, when the steering wheel and lamp are in straight-ahead position, substantially falling on the produced center radius line of one arc of movement of said swinging point from straight-ahead position.

5. In a vehicle, a steering wheel, a headlamp mounted for horizontal pivotal movements, means having connection with and movable upon a steering movement of said wheel, a double-link connection between said lamp and a swinging point on said means, the point of connection of said links when the steering wheel and mechanism are in straight-ahead position substantially falling on the produced center radius line of one arc of movement of said swinging point from straight-ahead position.

6. In a vehicle, a steering rod, a head-lamp mounted for horizontal pivotal movements and having a laterally projecting arm, and means connecting said steering rod and arm and having pivotal connection with each and having a swinging point, the point of connection of said means with said arm, when the steering wheel and lamp are in straight-ahead position, substantially falling on a line which is equidistant from the neutral position of said swinging point and a predetermined swung position thereof and which is produced through the center from which said point is swung.

7. In a vehicle, a steering rod, a head-lamp mounted for horizontal pivotal movements and having an arm swinging therewith, and a link member connecting said arm and rod and having pivotal connection with each, the point of connection of said member and arm, when the steering wheel and lamp are in straight-ahead position, substantially falling on the produced center radius line of one arc of movement of the point of connection of said member and steering rod from straight-ahead position.

8. In a vehicle, a steering rod, a head-lamp mounted for horizontal pivotal movements and having an arm swinging therewith, a link having pivotal connection with each said arm and rod and describing an obtuse angle with said arm when the steering rod and lamp are in straight-ahead position, the point of connection of said link and arm, when the steering wheel and lamp are in straight-ahead position, substantially falling on a line produced through the swinging axis of the point of connection of said link and steering rod and bisecting a predetermined arc described by said point when moved in one direction from neutral position.

9. The combination with the steering-knuckle connecting-bar of a vehicle, of a pair of head-lamps carried for relative pivotal movements by the vehicle, of separate mechanisms connecting said lamps and bar at different points on the latter for causing one lamp to have turning movements relative to the vehicle and permitting the other lamp to remain substantially stationary relative to the vehicle when said bar is moved in one direction, and vice versa.

10. The combination with a longitudinally shiftable connecting bar of the steering-gear of a vehicle, of a pair of lamp carrying-shafts mounted for horizontal turning movements relative to the vehicle, and a jointed-arm connection between each shaft and said gear, said connections being attached to said bar at separated points respectively and broken in opposite directions whereby a movement of the steering-gear to turn the vehicle in one direction will impart a rocking movement to one shaft and permit the other to remain approximately stationary relative to the vehicle, and vice versa.

In testimony whereof, I have hereunto signed my name to this specification in the presence of two subscribing witnesses.

ORMOND H. PADDOCK.

Witnesses:
  E. E. THOMAS,
  M. H. MAYERS.